United States Patent
Kurokawa

(10) Patent No.: US 9,630,659 B2
(45) Date of Patent: Apr. 25, 2017

(54) FRAMEWORK STRUCTURE FOR VEHICLE

(71) Applicant: TOYOTA JIDOSHA KABUSHIKI KAISHA, Toyota-shi (JP)

(72) Inventor: Hiroyuki Kurokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/911,972

(22) PCT Filed: Jul. 22, 2014

(86) PCT No.: PCT/JP2014/069360
§ 371 (c)(1),
(2) Date: Feb. 12, 2016

(87) PCT Pub. No.: WO2015/029646
PCT Pub. Date: Mar. 5, 2015

(65) Prior Publication Data
US 2016/0194036 A1     Jul. 7, 2016

(30) Foreign Application Priority Data
Aug. 27, 2013   (JP) ................................. 2013-175901

(51) Int. Cl.
*B60J 7/00*     (2006.01)
*B62D 29/04*    (2006.01)
(Continued)

(52) U.S. Cl.
CPC ............. *B62D 29/04* (2013.01); *B62D 21/02* (2013.01); *B62D 25/04* (2013.01); *B62D 29/005* (2013.01)

(58) Field of Classification Search
CPC ... B29C 66/71; B62D 25/04; Y10T 29/49826; A61L 31/129; B07B 1/46; B61D 3/20;
(Continued)

(56) References Cited

U.S. PATENT DOCUMENTS 4,751,249 A * 6/1988 Wycech ................ B29C 44/184
264/267
4,769,391 A * 9/1988 Wycech ................ B62D 21/09
264/267
(Continued)

FOREIGN PATENT DOCUMENTS

JP   H09-323664 A   12/1997
JP   2008-126835 A   6/2008
(Continued)

OTHER PUBLICATIONS

International Search Report Issued Oct. 21, 2014 in PCT/JP14/69360 filed Jul. 22, 2014.

*Primary Examiner* — Kiran B Patel
(74) *Attorney, Agent, or Firm* — Oblon, McClelland, Maier & Neustadt, L.L.P.

(57) ABSTRACT

A framework structure for a vehicle includes a first frame member that configures part of a framework of the vehicle, a second frame member that is joined to the first frame member to thereby configure the framework having a closed cross-sectional structure, a first reinforcement member made of fiber-reinforced resin that has an engagement portion and is joined to an inner side of the first frame member, and a second reinforcement member made of fiber-reinforced resin that has an engaging portion, and is joined to an inner side of the second frame member. The engaging portion is engaged with the engagement portion, and the second reinforcement member configures, with the first reinforcement member, a reinforcement member having a closed cross-sectional structure.

8 Claims, 6 Drawing Sheets

(51) Int. Cl.
*B62D 25/04* (2006.01)
*B62D 29/00* (2006.01)
*B62D 21/02* (2006.01)

(58) Field of Classification Search
CPC .. A61F 2002/5053; A61F 2/5046; A61F 2/76; A61F 2/80
USPC .......................... 296/203.01, 187.03, 187.09
See application file for complete search history.

(56) References Cited

U.S. PATENT DOCUMENTS

| | | | | |
|---|---|---|---|---|
| 5,213,391 A * | 5/1993 | Takagi | ................ | B29C 44/1228 29/451 |
| 5,575,526 A * | 11/1996 | Wycech | ............. | B29C 44/1228 180/68.4 |
| 5,649,400 A * | 7/1997 | Miwa | .................. | B62D 29/002 156/79 |
| 5,766,719 A * | 6/1998 | Rimkus | ................ | B29C 44/184 428/132 |
| 5,806,919 A * | 9/1998 | Davies | ................ | B62D 29/002 296/187.02 |
| 5,888,600 A * | 3/1999 | Wycech | .................. | B29C 44/12 428/35.9 |
| 5,941,597 A * | 8/1999 | Horiuchi | ................ | B62D 25/04 296/193.06 |
| 6,003,274 A * | 12/1999 | Wycech | .................. | B29C 44/18 296/187.02 |
| 6,058,673 A * | 5/2000 | Wycech | .................. | B29C 44/18 296/187.02 |
| 6,092,864 A * | 7/2000 | Wycech | ................ | B29C 44/188 296/187.02 |
| 6,199,940 B1 * | 3/2001 | Hopton | .................. | B60J 5/0447 296/146.6 |
| 6,270,600 B1 * | 8/2001 | Wycech | .................. | B29C 44/12 156/79 |
| 6,321,793 B1 * | 11/2001 | Czaplicki | ............. | B29C 44/18 138/172 |
| 6,341,467 B1 * | 1/2002 | Wycech | .................. | B29C 44/18 296/193.06 |
| 6,793,274 B2 * | 9/2004 | Riley | .................. | B62D 29/002 296/187.03 |
| 6,866,331 B2 * | 3/2005 | Kropfeld | .............. | B62D 29/002 296/146.6 |
| 6,941,719 B2 * | 9/2005 | Busseuil | ................ | B62D 25/00 296/187.02 |
| 7,077,460 B2 * | 7/2006 | Czaplicki | ................ | B29C 44/18 296/187.02 |
| 7,125,461 B2 * | 10/2006 | Czaplicki | ............. | B62D 29/002 156/244.22 |
| 7,169,344 B2 * | 1/2007 | Coon | ................... | B62D 29/002 264/263 |
| 7,318,873 B2 * | 1/2008 | Czaplicki | ................ | B29C 70/70 156/293 |
| 8,256,829 B2 * | 9/2012 | Browne | ................ | B62D 21/15 296/187.02 |
| 8,746,780 B2 * | 6/2014 | Belpaire | ................ | B62D 25/16 296/187.02 |
| 8,991,909 B2 * | 3/2015 | Matsuda | ............... | B62D 25/02 296/187.12 |
| 9,290,211 B2 * | 3/2016 | Belpaire | ............ | B29C 44/1228 |
| 2001/0042353 A1 * | 11/2001 | Honda | ................ | B29C 44/1228 296/146.6 |

FOREIGN PATENT DOCUMENTS

| | | |
|---|---|---|
| JP | 2008-267393 A | 11/2008 |
| JP | 2009-001238 A | 1/2009 |
| JP | 2010-195352 A | 9/2010 |
| JP | 2015-000680 A | 1/2015 |
| JP | 2015-033895 A | 2/2015 |

* cited by examiner

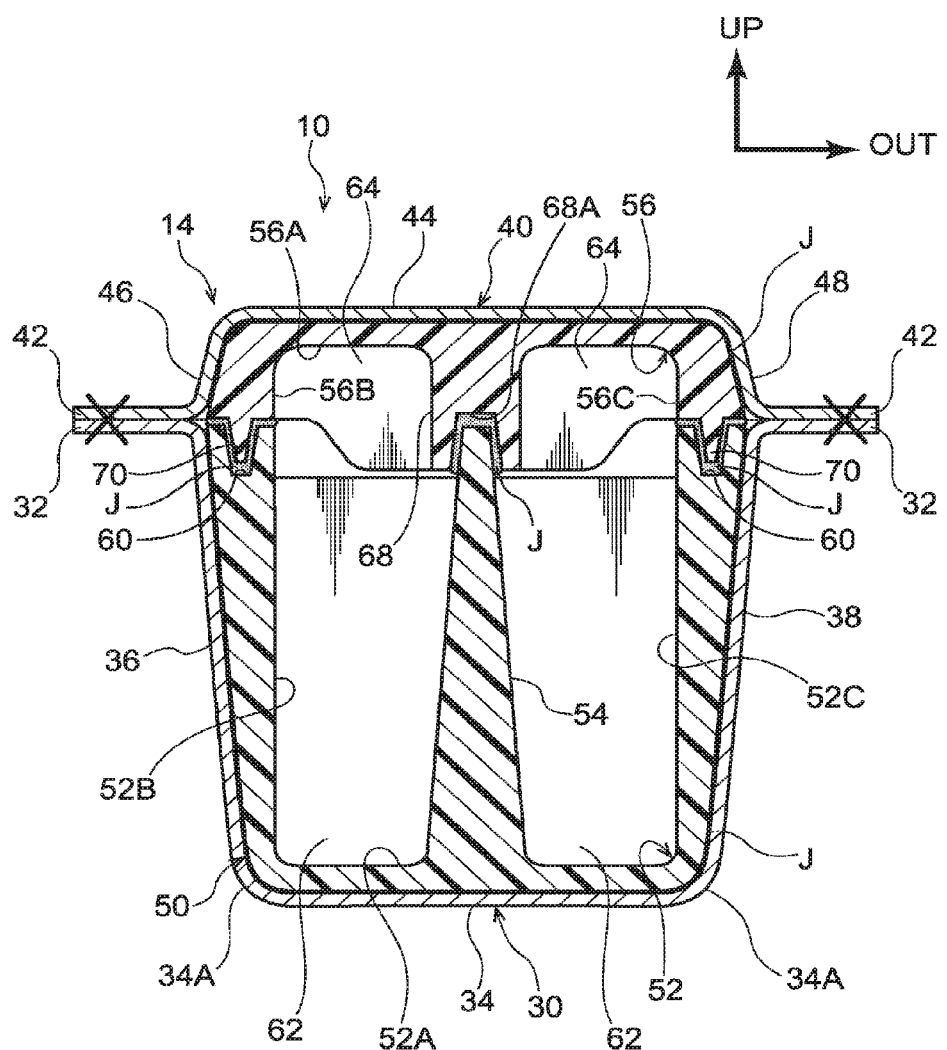

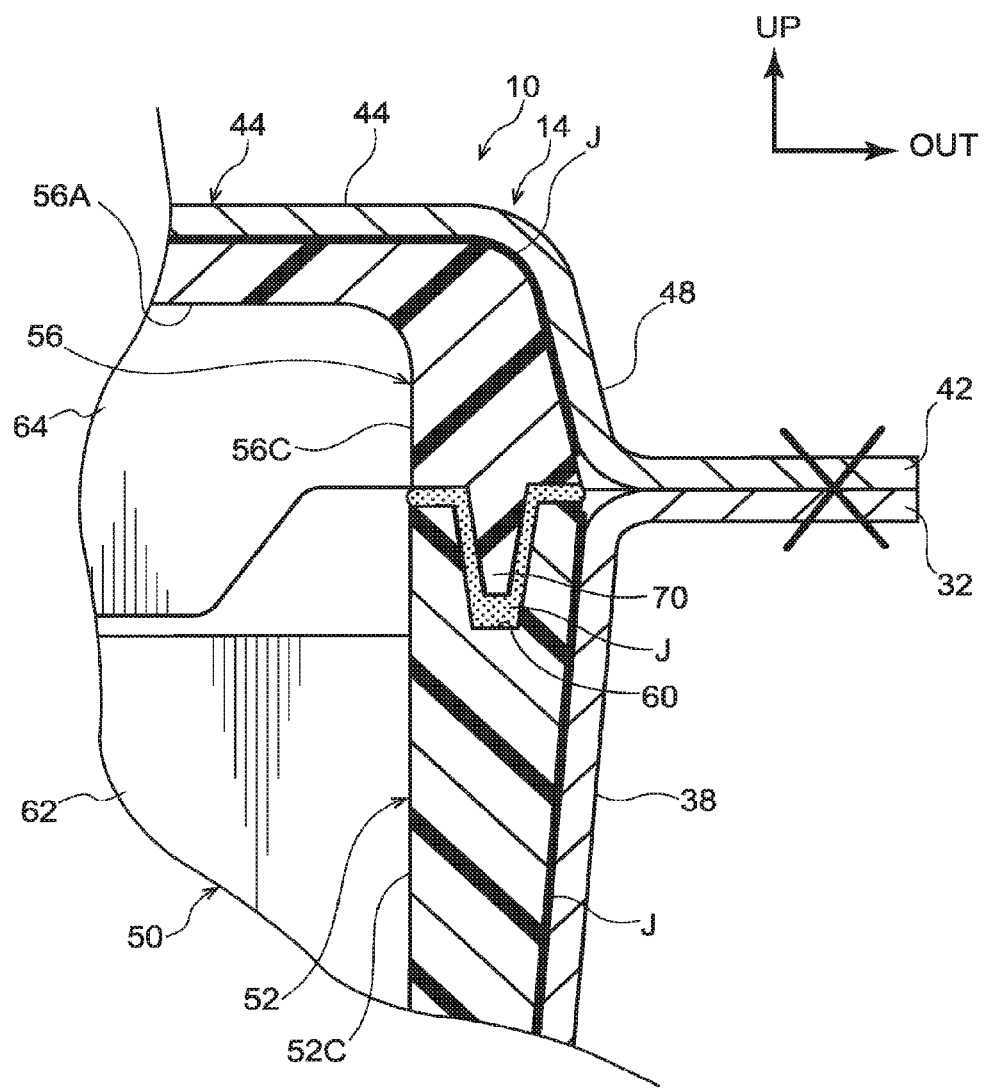

FRAMEWORK STRUCTURE FOR VEHICLE

TECHNICAL FIELD

The present invention relates to a framework structure for a vehicle.

BACKGROUND ART

A vehicle frame member structure, in which an inside frame member having a closed cross-sectional structure is disposed in a curved portion of a vehicle frame member having a closed cross-sectional structure and which is configured to control bending deformation produced in the curved portion by the input of a load, has conventionally been known (e.g., see JP-A No. 2008-126835).

SUMMARY OF INVENTION

Technical Problem

However, there is still room for improvement regarding structures in which a reinforcement member having a closed cross-sectional structure is easily disposed in a frame member for a vehicle having a closed cross-sectional structure.

Therefore, it is an object of the present invention to obtain a framework structure for a vehicle with which a reinforcement member having a closed cross-sectional structure can be easily disposed in a frame member for a vehicle having a closed cross-sectional structure.

Solution to Problem

In order to achieve the above object, a framework structure for a vehicle of a first aspect pertaining to the present invention includes: a first frame member that configures a part of a framework of the vehicle; a second frame member that is joined to the first frame member to thereby configure the framework, the framework having a closed cross-sectional structure; a first reinforcement member made of fiber-reinforced resin, the first reinforcement member having an engagement portion and being joined to an inner side of the first frame member; and a second reinforcement member that is made of fiber-reinforced resin, the second reinforcement member having an engaging portion and being joined to an inner side of the second frame member, wherein the engaging portion is engaged with the engagement portion, whereby the second reinforcement member configures, with the first reinforcement member, a reinforcement member having a closed cross-sectional structure.

According to the first aspect pertaining to the present invention, the engagement portion of the first reinforcement member joined to the first frame member and the engaging portion of the second reinforcement member joined to the second frame member are engaged with one another, so that the reinforcement member having a closed cross-sectional structure is configured. Consequently, the reinforcement member having a closed cross-sectional structure is easily disposed in the frame member having a closed cross-sectional structure configuring the framework of the vehicle.

Furthermore, a framework structure for a vehicle of a second aspect pertaining to the present invention is the framework structure for a vehicle of the first aspect, wherein the engagement portion of the first reinforcement member is configured to include a engagement rib, and the engaging portion of the second reinforcement member is configured to include a pair of engaging ribs that sandwich, hold, and engage with the engagement rib.

According to the second aspect pertaining to the present invention, the engagement rib is sandwiched between, held by, and engaged with the pair of engaging ribs. Consequently, the engaging strength of the engaging ribs with respect to the engagement rib is improved compared to a configuration where the engagement rib is not sandwiched between, held by, and engaged with the pair of engaging ribs.

Furthermore, a framework structure for a vehicle of a third aspect pertaining to the present invention is the framework structure for a vehicle of the second aspect, wherein the second reinforcement member has a partition wall portion between the pair of engaging ribs.

According to the third aspect pertaining to the present invention, the second reinforcement member has the partition wall portion between the pair of engaging ribs. Consequently, when the first frame member becomes deformed by the input of a load and the first reinforcement member is moved toward the second frame member side, the engagement rib is pressed into contact with the partition wall portion. Thus, the load input to the first frame member is efficiently transmitted to the second frame member and bending deformation produced in the first frame member is controlled.

Furthermore, a framework structure for a vehicle of a fourth aspect pertaining to the present invention is the framework structure for a vehicle of the second or third aspect, wherein a position where the pair of engaging ribs sandwich, hold, and engage with the engagement rib is located at a first frame member side of the position where the second frame member is joined to the first frame member.

According to the fourth aspect pertaining to the present invention, the position where the pair of engaging ribs sandwich, hold, and engage with the engagement rib is located at the first frame member side of the position where the second frame member is joined to the first frame member. Consequently, a drop in the strength (rigidity) of the engagement rib is controlled.

Furthermore, a framework structure for a vehicle of a fifth aspect pertaining to the present invention is the framework structure for a vehicle of the first aspect, wherein the engaging portion is joined by an adhesive to the engagement portion.

According to the fifth aspect pertaining to the present invention, the engaging portion is joined by the adhesive to the engagement portion. Consequently, the joint strength between the first reinforcement member and the second reinforcement member is improved and the framework reinforcement effect resulting from the reinforcement member is enhanced.

Furthermore, a framework structure for a vehicle of a sixth aspect pertaining to the present invention is the framework structure for a vehicle of any of the first to fifth aspects, wherein the first reinforcement member and the second reinforcement member each have plural reinforcement ribs lined up an interval apart from one another in a longitudinal direction.

According to the sixth aspect pertaining to the present invention, the first reinforcement member and the second reinforcement member each have plural reinforcement ribs lined up an interval apart from one another in the longitudinal direction. Consequently, the strength (rigidity) of the first reinforcement member and the second reinforcement member is improved compared to a case where the first reinforcement member and the second reinforcement member each do not have plural reinforcement ribs.

Furthermore, a framework structure for a vehicle of a seventh aspect pertaining to the present invention is the framework structure for a vehicle of any of the first to sixth aspects, wherein an orientation of fibers in the first reinforcement member and the second reinforcement member is along a longitudinal direction.

According to the seventh aspect pertaining to the present invention, the orientation of the fibers of the first reinforcement member and the second reinforcement member is along the longitudinal direction. In other words, the orientation of the fibers of the first reinforcement member and the second reinforcement member is along the input direction of a load. Consequently, the strength (rigidity) of the first reinforcement member and the second reinforcement member with respect to an input load is improved compared to a case where the orientation of the fibers of the first reinforcement member and the second reinforcement member is not along the longitudinal direction.

Advantageous Effects of Invention

As described above, according to the first aspect pertaining to the present invention, the reinforcement member having a closed cross-sectional structure can be easily disposed in the frame member for a vehicle having a closed cross-sectional structure.

According to the second aspect pertaining to the present invention, the engaging strength of the engaging rib with respect to the engagement rib can be improved.

According to the third aspect pertaining to the present invention, the load input to the first frame member can be efficiently transmitted to the second frame member and bending deformation produced in the first frame member can be controlled.

According to the fourth aspect pertaining to the present invention, a drop in the strength (rigidity) of the mated rib can be controlled.

According to the fifth aspect pertaining to the present invention, the joint strength between the first reinforcement member and the second reinforcement member can be improved and the framework reinforcement effect resulting from the reinforcement member can be enhanced.

According to the sixth aspect pertaining to the present invention, the strength (rigidity) of the first reinforcement member and the second reinforcement member can be improved.

According to the seventh aspect pertaining to the present invention, the strength (rigidity) of the first reinforcement member and the second reinforcement member with respect to an input load can be improved.

BRIEF DESCRIPTION OF DRAWINGS

FIG. 5 is a cross-sectional view corresponding to FIG. 3 showing the reinforcement member pertaining to a second embodiment; and FIG. 6 is an enlarged cross-sectional view showing part of the reinforcement member pertaining to the second embodiment.

DESCRIPTION OF EMBODIMENTS

Figure 1:
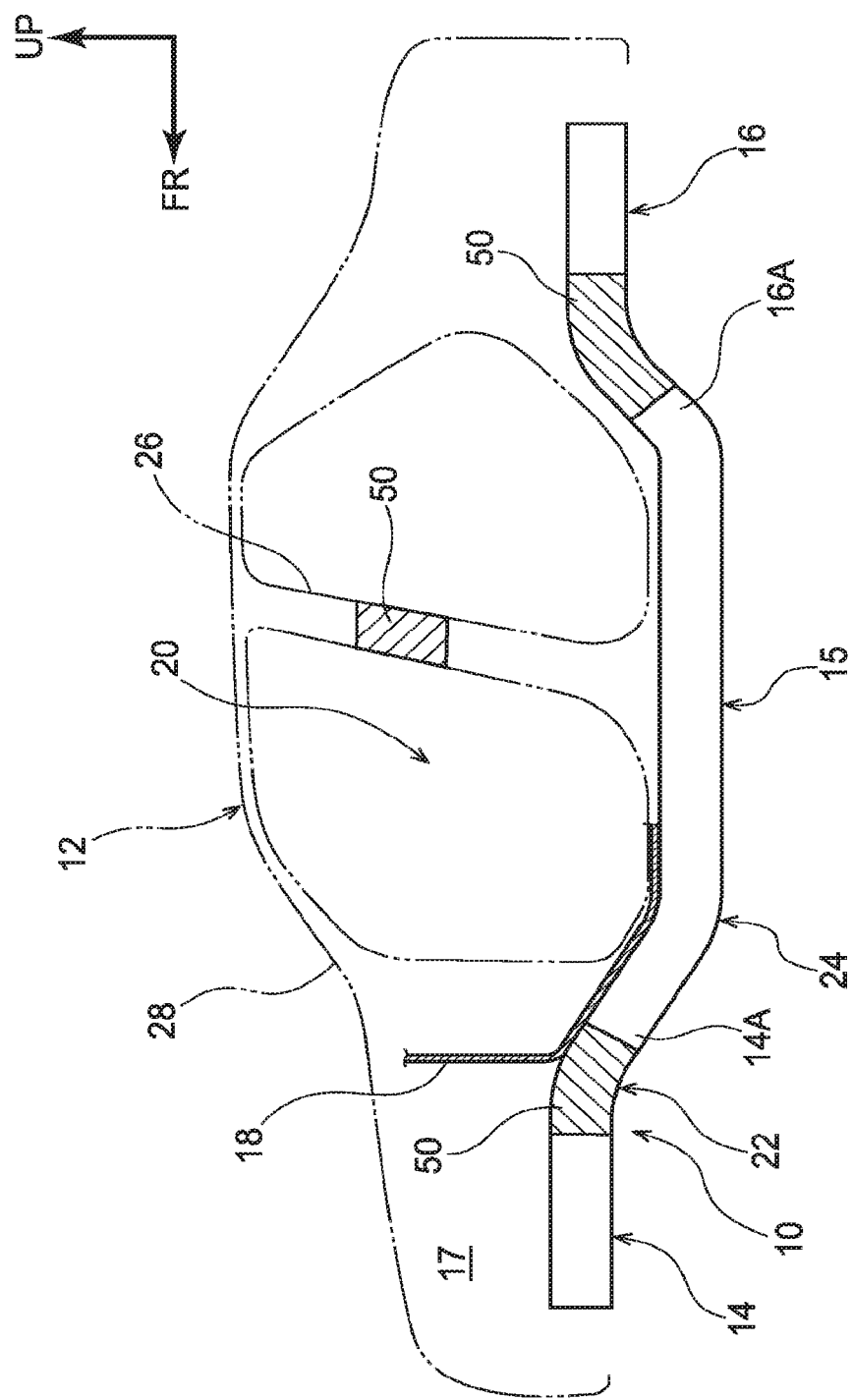
FIG. 1 is a side view showing the schematic configuration of a framework structure for a vehicle pertaining to embodiments.

Embodiments of the present invention will be described in detail below on the basis of the drawings. It should be noted that, for convenience of description, arrow UP appropriately shown in the drawings indicates a vehicle body upward direction, arrow FR indicates a vehicle body forward direction, and arrow OUT indicates outward in a vehicle width direction. Furthermore, unless otherwise noted, when the directions of up and down, front and rear, and left and right are used in the following description, these will be understood to mean up and down in the vehicle body up and down direction, front and rear in the vehicle body front and rear direction, and left and right in the vehicle body left-right direction (vehicle width direction). Moreover, FIG. 1 shows the left side of a vehicle 12 equipped with a framework structure 10 pertaining to the embodiments, but the right side of the vehicle 12 is also the same because the vehicle 12 is bilaterally symmetrical.

As shown in FIG. 1, a left and right pair of front side members 14 serving as frame members having closed cross-sectional structures and whose longitudinal direction coincides with the vehicle body front and rear direction are disposed on both side portions of the front portion of the vehicle 12. A sloped portion (kick portion) 14A is formed in the longitudinal direction intermediate portion of each front side member 14, and each front side member 14 extends in the vehicle body front and rear direction in a position (height position) at which its section on the vehicle body front side of the sloped portion 14A is a predetermined height higher than its section on the vehicle body rear side of the sloped portion 14A.

Furthermore, a left and right pair of rear floor side members 16 serving as frame members having closed cross-sectional structures and whose longitudinal direction coincides with the vehicle body front and rear direction are disposed on both side portions of the rear portion of the vehicle 12. A sloped portion (kick portion) 16A is formed in the longitudinal direction intermediate portion of each rear floor side member 16, and each rear floor side member 16 extends in the vehicle body front and rear direction in a position (height position) at which its section on the vehicle body rear side of the sloped portion 16A is a predetermined height higher than its section on the vehicle body front side of the sloped portion 16A.

Additionally, the front side members 14 and the rear floor side members 16 are formed integrally and continuously with one another via floor members 15 serving as frame members having closed cross-sectional structures that extend in the vehicle body front and rear direction. Furthermore, a substantially flat plate-shaped dash panel 18 that sections off an engine compartment room 17 and a cabin 20 from one another is disposed in the vehicle 12.

It should be noted that the framework structure 10 on the rear floor side member 16 side is the same as the framework structure 10 on the front side member 14 side, so the framework structure 10 on the front side member 14 side will be taken as an example and described below. First, a first embodiment will be described.

First Embodiment

Figure 2:
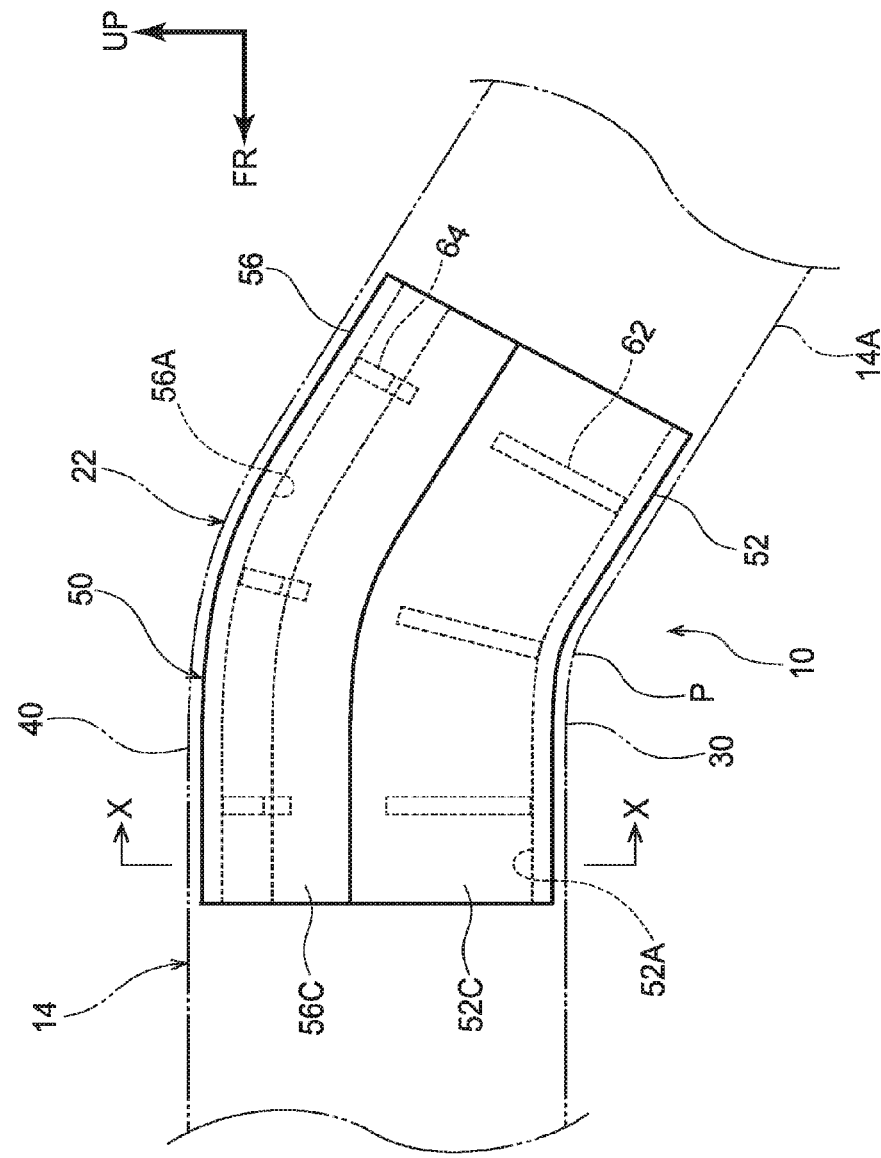
FIG. 2 is a side view showing a reinforcement member pertaining to a first embodiment.
Figure 3:
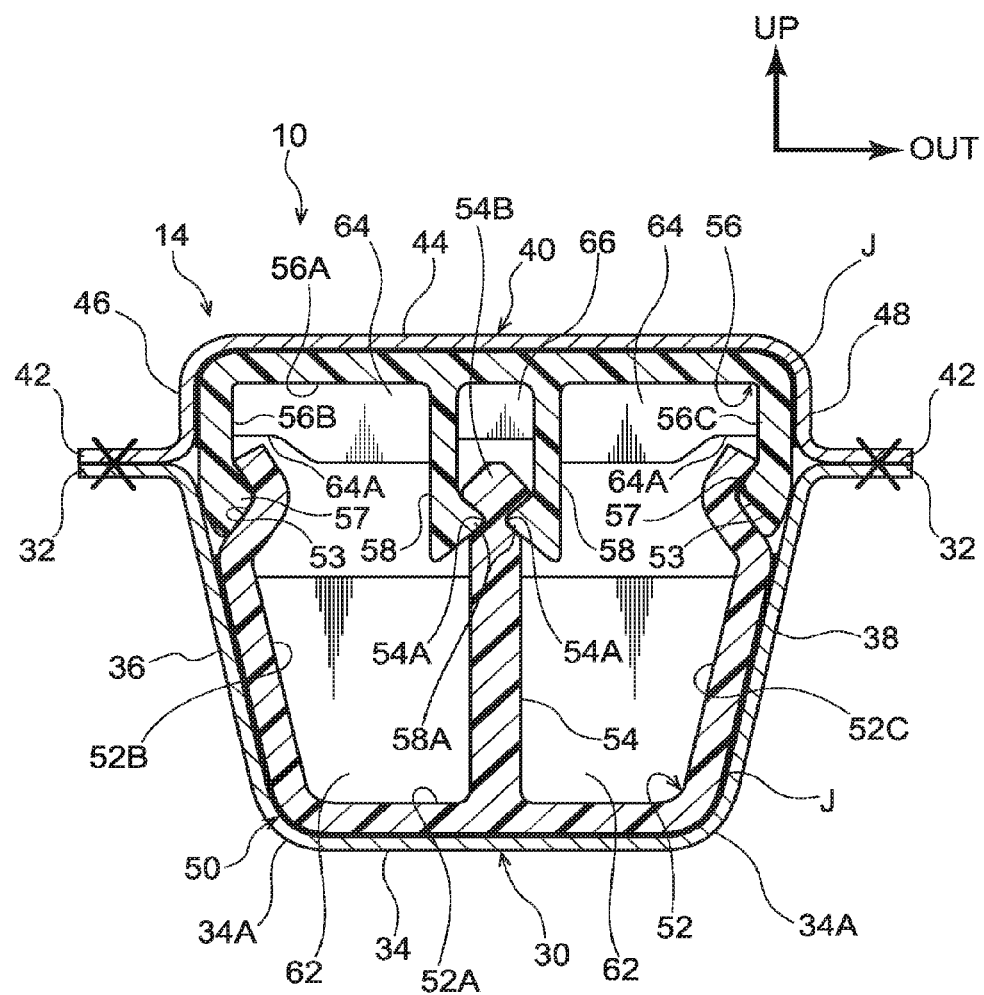
FIG. 3 is a cross-sectional view as seen from the direction of the arrows associated with line X-X of FIG. 2.

As shown in FIG. 2 and FIG. 3, each front side member 14 has a lower member 30 serving as a first frame member and an upper member 40 serving as a second frame member. The lower member 30 is molded using a steel plate or the like in a cross-sectional hat shape whose depth is deep, and the upper member 40 is molded using a steel plate or the like in a cross-sectional hat shape whose depth is shallow. Additionally, flange portions 32 of the lower member 30 and flange portions 42 of the upper member 40 are joined to one another by spot welding or the like, so that the front side member 14 is configured to have a closed cross-sectional structure.

Furthermore, as shown in FIG. 1, the front end portion and the rear end portion (the portion bordering the floor member 15) of the sloped portion 14A of the front side member 14 are a front side bent portion 22 and a rear side bent portion 24, respectively. The front side bent portion 22 is a bent portion whose bend point toward the vehicle body upper side, and the rear side bent portion 24 is a bent portion whose bend points toward the vehicle body lower side.

Consequently, when a load heading toward the vehicle body rear side is input to the front end portion of the front side member 14 during a frontal crash of the vehicle 12, for example, the front side bent portion 22 undergoes bending deformation toward the vehicle body upper side (a lower wall 34 of the lower member 30 shown in FIG. 3 and ridgeline portions 34A that are vehicle width direction end portions of the lower wall 34 undergo buckling deformation toward the vehicle body upper side), and the rear side bent portion 24 undergoes bending deformation (buckling deformation) toward the vehicle body lower side.

In other words, in the front side bent portion 22, the lower wall 34 of the lower member 30 shown in FIG. 2 and FIG. 3 becomes the wall portion on the compressive deformation side (stress concentration side), and an upper wall 44 of the upper member 40 becomes the wall portion on the tensile deformation side. Additionally, in the rear side bent portion 24, the upper wall 44 of the upper member 40 becomes the wall portion on the compressive deformation side (stress concentration side), and the lower wall 34 of the lower member 30 becomes the wall portion on the tensile deformation side.

Furthermore, reinforcement members 50 each having a closed cross-sectional structure and molded using a fiber-reinforced resin material (FRP), such as a glass fiber-reinforced resin material (GFRP) or a carbon fiber-reinforced resin material (CFRP), for example, are disposed in the closed cross-sectional structures in the front side bent portion 22 and the rear side bent portion 24 of the front side member 14.

It should be noted that the reinforcement members 50 disposed in the front side bent portion 22 and the rear side bent portion 24 are the same, so here the reinforcement member 50 disposed in the front side bent portion 22 will be described. Furthermore, the reinforcement members 50 disposed in the front side bent portion 22 and in the rear side bent portion 24 are, as shown in FIG. 2, bent in conformity with the bent shapes of the front side bent portion 22 and the rear side bent portion 24, but FIG. 4 shows a state in which the reinforcement member 50 is not bent.

Figure 4:
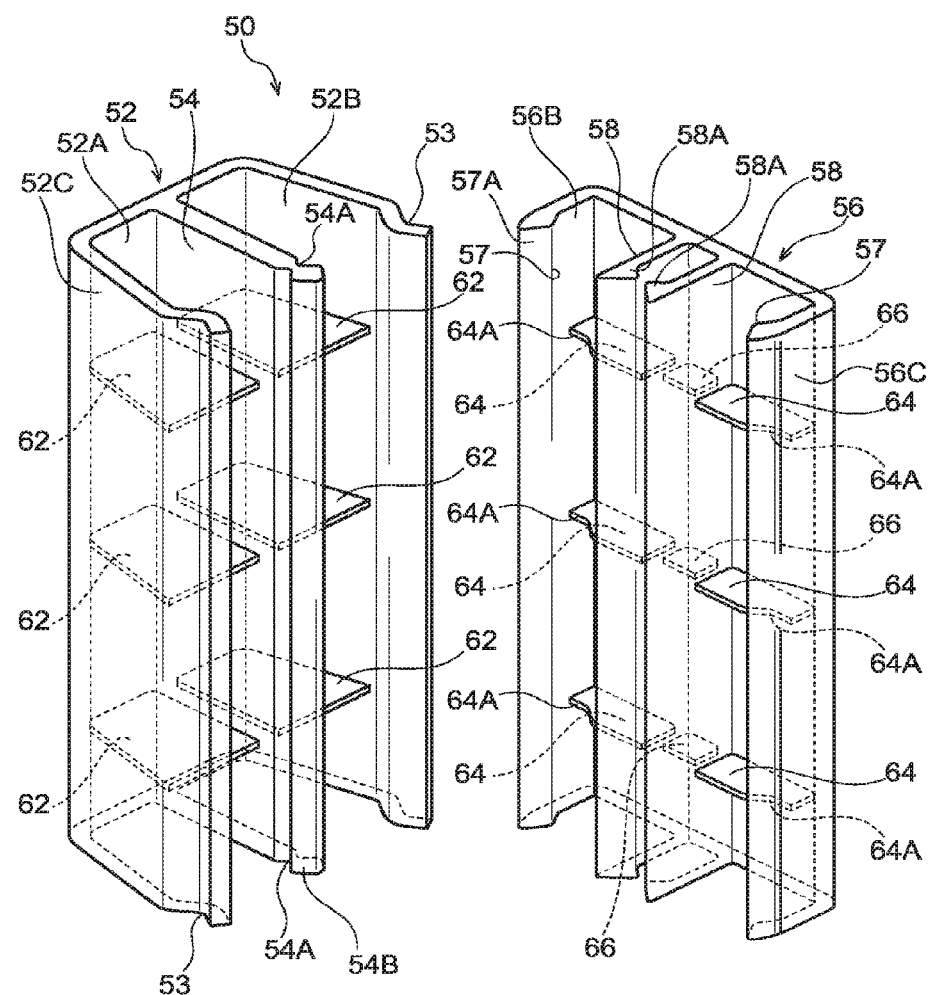
FIG. 4 is an exploded perspective view showing the reinforcement member pertaining to the first embodiment.

As shown in FIG. 2 to FIG. 4, each reinforcement member 50 has a first reinforcement member 52, which has a cross-sectional "E" shape and is placed along the lower wall 34, an inner wall 36, and an outer wall 38 of the lower member 30, and a second reinforcement member 56, which has a cross-sectional substantial "E" shape and is placed along the upper wall 44, an inner wall 46, and an outer wall 48 of the upper member 40.

Specifically, the outer surface of a lower wall 52A of the first reinforcement member 52 and the outer surfaces—excluding the upper end portions—of an inner wall 52B and an outer wall 52C of the first reinforcement member 52 are strongly joined by a structural adhesive J, which has a high adhesive strength, to the inner surfaces of the lower wall 34, the inner wall 36, and the outer wall 38 of the lower member 30. Additionally, the outer surface of an upper wall 56A of the second reinforcement member 56 and the outer surfaces—excluding the lower end portions—of an inner wall 56B and an outer wall 56C of the second reinforcement member 56 are strongly joined by a structural adhesive J, which has a high adhesive strength, to the inner surfaces of the upper wall 44, the inner wall 46, and the outer wall 48 of the upper member 40.

Furthermore, recessed portions 53 serving as outer side engagement portions with which later-described raised portions 57 engage, are formed, along the longitudinal direction, in the outer surface sides of the upper end portions of the inner wall 52B and the outer wall 52C of the first reinforcement member 52. Additionally, raised portions 57 serving as outer side engaging portions that engage with the recessed portions 53 are formed along the longitudinal direction in the inner surface sides of the lower end portions of the inner wall 56B and the outer wall 56C of the second reinforcement member 56. It should be noted that the insides of the lower ends of the raised portions 57 are tapered surfaces 57A (see FIG. 4).

A engagement rib 54 having a height slightly lower than the height of the inner wall 52B and the outer wall 52C is projectingly disposed along the longitudinal direction on the inner surface side and in the transverse direction center portion of the lower wall 52A of the first reinforcement member 52. Additionally, recessed groove portions 54A serving as inner side engagement portions with which a later-described pair of claw portions 58A engage, are formed along the longitudinal direction, in both the left and right side surfaces of the upper end portion of the mated rib 54, and a bulging portion 54B that bulges in the left-right direction is formed on the upper side of the recessed groove portions 54A.

A pair of engaging ribs 58 having a height slightly higher than the height of the inner wall 56B and the outer wall 56C are projectingly disposed along the longitudinal direction on the inner surface side and in the transverse direction center portion of the upper wall 56A of the second reinforcement member 56. Additionally, claw portions 58A serving as inside engaging portions that engage with the recessed groove portions 54A are formed along the longitudinal direction on the lower end portions of the pair of engaging ribs 58.

It should be noted that the claw portions 58A are formed on the surface sides opposing one another, in such a way that they project in substantially triangular shapes as seen in a cross-sectional view orthogonal to the longitudinal direction. Additionally, the recessed groove portions 54A are formed in such a way that they are scooped out in substantially triangular shapes as seen in a cross-sectional view orthogonal to the longitudinal direction, and the interval between the pair of claw portions 58A is formed in such a way as to be slightly narrower than the plate thickness of the section of the engagement rib 54 between the recessed groove portions 54A.

Because of this, the pair of claw portions 58A (the mating ribs 58) can sandwich and hold the engagement rib 54 at the recessed groove portions 54A and can strongly engage with the recessed groove portions 54A. In other words, it is difficult for the pair of claw portions 58A engaged with the recessed groove portions 54A to come out from the recessed groove portions 54A.

In the first reinforcement member 52 and the second reinforcement member 56 having the configurations described above, in conjunction with the operation whereby the flange portions 32 of the lower member 30 and the flange portions 42 of the upper member 40 are stacked on (joined to) one another, the raised portions 57 of the second reinforcement member 56 become engaged with the recessed portions 53 of the first reinforcement member 52 and the pair of claw portions 58A of the second reinforcement member 56 become engaged with the recessed groove portions 54A of the first reinforcement member 52.

Specifically, as the first reinforcement member 52 and the second reinforcement member 56 move closer to one another, the upper end portions of the inner wall 52B and the outer wall 52C are pushed from their outer surface sides by the raised portions 57. When this happens, the upper end portions of the inner wall 52B and the outer wall 52C undergo elastic deformation in directions in which they move closer to one another, allow the raised portions 57 to move closer, and thereafter return to their original state, so that the raised portions 57 become caught in (engaged with) the recessed portions 53.

Furthermore, as the first reinforcement member 52 and the second reinforcement member 56 move closer to one another, the bulging portion 54B formed on the upper end portion of the engagement rib 54 becomes inserted between the pair of claw portions 58A (the engaging ribs 58). When this happens, the engaging ribs 58 undergo elastic deformation in such a way that the interval between the pair of claw portions 58A is increased, allow the insertion of the bulging portion 54B, and thereafter return to their original state, so that the pair of claw portions 58A become caught in (mated with) the recessed groove portions 54A.

Thus, the first reinforcement member 52 and the second reinforcement member 56 become integrated, and the reinforcement member 50 having a closed cross-sectional structure is placed in the closed cross-sectional structure of the front side bent portion 22 of the front side member 14. In other words, a double closed cross-sectional structure is configured in the front side bent portion 22 of the front side member 14.

It should be noted that, because the insides of the lower ends of the raised portions 57 are the tapered surfaces 57A, even if there are molding variations between the first reinforcement member 52 and the second reinforcement member 56, as the first reinforcement member 52 and the second reinforcement member 56 move closer to one another, the raised portions 57 are reliably placed on the outer surface sides of the upper end portions of the inner wall 52B and the outer wall 52C.

Similarly, because the insides of the lower ends of the pair of claw portions 58A are also tapered surfaces, even if there are molding variations between the first reinforcement member 52 and the second reinforcement member 56, as the first reinforcement member 52 and the second reinforcement member 56 move closer to one another, the bulging portion 54B is reliably inserted between the pair of claw portions 58A (the engaging ribs 58).

In other words, as the lower member 30 and the upper member 40 are joined to one another, the second reinforcement member 56 can reliably sandwich, hold, and engage with the first reinforcement member 52. It should be noted that, as shown in FIG. 3, the position at which the raised portions 57 engage with the recessed portions 53—and particularly the position at which the claw portions 58A sandwich, hold, and engage with the recessed groove portions 54A—is on the lower member 30 side of the flange portions 32 and 42. In this way, when the height of the engagement rib 54 is formed low, a drop in the strength (rigidity) of the engagement rib 54 is controlled.

Furthermore, as shown in FIG. 2 to FIG. 4, plural reinforcement ribs 62 lined up in the longitudinal direction are projectingly disposed on the inner surface side of the lower wall 52A of the first reinforcement member 52. The reinforcement ribs 62 are each formed in the shape of a rectangular flat plate and integrally couple the inner wall 52B and the engagement rib 54 to one another and the outer wall 52C and the engagement rib 54 to one another.

It should be noted that it is preferred that the reinforcement ribs 62 adjacent to one another across the engagement rib 54 be formed in the same positions in the longitudinal direction, but it is alright if they are a little out of alignment. Furthermore, as shown in FIG. 2, it is preferred that the reinforcement ribs 62 be projectingly disposed at least on a maximum bent portion P (also including a position somewhat offset from the precise maximum bent portion P). Moreover, the plate thickness of the reinforcement ribs 62 may, for example, be formed the same as or a little thinner than the plate thickness of the engagement rib 54.

Furthermore, it suffices for the reinforcement ribs 62 to couple the inner wall 52B and the engagement rib 54 to one another and the outer wall 52C and the engagement rib 54 to one another, and the reinforcement ribs 62 are not limited to a configuration where they are projectingly disposed on the lower wall 52A. For example, the invention may also have a configuration where a gap is formed between the lower end surfaces of the reinforcement ribs 62 and the inner surface of the lower wall 52A.

Furthermore, as shown in FIG. 2 to FIG. 4, plural reinforcement ribs 64 lined up in the longitudinal direction are projectingly disposed on the inner surface side of the upper wall 56A of the second reinforcement member 56. The reinforcement ribs 64 are each formed in the shape of a generally rectangular flat plate and integrally couple the inner wall 56B and the inside engaging rib 58 to one another and the outer wall 56C and the outer side engaging rib 58 to one another.

Moreover, plural partition wall ribs 66 lined up in the longitudinal direction are projectingly disposed on the section of the inner surface side of the upper wall 56A between the pair of mating ribs 58. The partition wall ribs 66 serving as partition wall portions are each formed in the shape of a rectangular flat plate and integrally couple the inside engaging rib 58 and the outer side engaging rib 58 to one another. Additionally, the partition wall ribs 66 are formed having a height at which they do not contact (non-contact) the bulging portion 54B when the pair of claw portions 58A are caught in (engaged with) the recessed groove portions 54A.

Similarly, the reinforcement ribs 64 are formed having a height at which they do not contact (non-contact) the upper end portions of the inner wall 52B and the outer wall 52C when the raised portions 57 are caught in (engaged with) the recessed portions 53. In other words, cutout portions 64A for allowing the upper end portions of the inner wall 52B and the outer wall 52C are formed on the inner wall 56B side and the outer wall 56C side of the reinforcement ribs 64.

It should be noted that it is preferred that the reinforcement ribs 64 and the partition wall ribs 66 adjacent to one another across the engaging ribs 58 be formed in the same positions in the longitudinal direction, but it is alright if they are a little out of alignment. Furthermore, it is preferred that the reinforcement ribs 64 and the partition wall ribs 66 be projectingly disposed at least on the maximum bent portion P (also including a position somewhat offset from the precise maximum bent portion P). In other words, it is preferred that the reinforcement ribs 64 and the partition wall ribs 66 be formed in the same positions in the longitudinal direction as the reinforcement ribs 62, but it is alright if they are a little out of alignment.

Moreover, the plate thicknesses of the reinforcement ribs 64 and the partition wall ribs 66 may, for example, be formed the same as or a little thinner than the plate thickness of the engaging ribs 58. Furthermore, it suffices for the reinforcement ribs 64 to couple the inner wall 56B and the inside engaging rib 58 to one another and the outer wall 56C and the outside engaging rib 58 to one another, and the invention is not limited to a configuration where the reinforcement ribs 64 are projectingly disposed on the upper wall 56A. For example, the invention may also have a configuration where a gap is formed between the upper end surfaces of the reinforcement ribs 64 and the inner surface of the upper wall 56A.

Furthermore, the invention may also have a configuration where just one each of the reinforcement ribs 62 and 64 and the partition wall ribs 66 are projectingly disposed on the maximum bent portion P, and the invention may also have a configuration where not even one of the reinforcement ribs 62 and 64 is projectingly disposed. However, the strength (rigidity) of the first reinforcement member 52 is improved in proportion to the number of the reinforcement ribs 62 that are projectingly disposed, and the strength (rigidity) of the second reinforcement member 56 is improved in proportion to the number of the reinforcement ribs 64 that are projectingly disposed, so it is preferred that a plurality each of the reinforcement ribs 62 and 64 be projectingly disposed a predetermined interval apart from one another (e.g., at equal intervals) in the longitudinal direction.

Furthermore, the first reinforcement member 52 and the second reinforcement member 56 are manufactured by injection molding, for example, and the gate mark (not shown in the drawings) that is the injection opening for the fiber-reinforced resin material is formed in the central sections thereof at one longitudinal direction end portion side. In other words, when the fiber-reinforced resin material flows in from the gate of the mold (not shown in the drawings) corresponding to this site and the first reinforcement member 52 and the second reinforcement member 56 are molded, the orientation of the fibers in the lower wall 52A, the inner wall 52B, the outer wall 52C, the upper wall 56A, the inner wall 56B, and the outer wall 56C is along the longitudinal direction.

It should be noted that, because the engagement rib 54 and the engaging ribs 58 are also integrally molded as a result of the fiber-reinforced resin material flowing in from the gate of the mold described above, the orientation of the fibers in the engagement rib 54 and the engaging ribs 58 is also along the longitudinal direction. In other words, the first reinforcement member 52 (the engagement rib 54) and the second reinforcement member 56 (the engaging ribs 58) extend in the longitudinal direction along the input direction of a load input to the front side member 14, and the fibers are oriented in that longitudinal direction.

Next, the action of the framework structure 10 for the vehicle 12 pertaining to the first embodiment having the above configurations will be described.

A support portion that supports a non-illustrated suspension member in a suspended state and an engine mount that supports a non-illustrated engine and transmission (power unit) in a suspended state are disposed in the straight section of the front side member 14 on the vehicle body front side of the front side bent portion 22. For that reason, when the vehicle 12 travels, a load heading toward the vehicle body lower side is input to the straight section of the front side member 14 via the support portion and the engine mount due to vibration produced in the vehicle 12.

Here, the front side bent portion 22 is a site that is bent and formed beforehand and is a site that becomes a deformation origin. Consequently, due to the input of the load, sometimes the front side bent portion 22 undergoes elastic deformation in such a way that it bends, and when the amount of that elastic deformation increases, the rigidity of the vehicle body drops, vibration and noise occur in the vehicle 12, and the maneuvering stability of the vehicle 12 is diminished.

However, as mentioned above, the reinforcement member 50 is disposed in the front side bent portion 22 (see FIG. 2). Consequently, when the front side bent portion 22 undergoes elastic deformation in such a way that it bends, the upper wall 56A of the second reinforcement member 56 placed on the upper wall 44 side of the upper member 40 that is the tensile deformation side is pulled along its longitudinal direction, so a reaction force counter to that tensile force is produced in the upper wall 56A. In particular, because the longitudinal direction also coincides with the orientation direction of the fibers, strength (rigidity) is improved and a strong reaction force can be produced compared to a case where the longitudinal direction does not coincide with the orientation direction of the fibers.

Moreover, the reinforcement ribs 62 and 64 are formed at least on the maximum bent portion P of the reinforcement member 50 (see FIG. 2 to FIG. 4), so the strength (rigidity) of the reinforcement member 50 can be improved and cross-sectional deformation—particularly in the vehicle width direction—of the reinforcement member 50 can be controlled or prevented. In other words, cross-sectional deformation, in the vehicle width direction, of the front side bent portion 22 where the reinforcement member 50 is disposed can be controlled or prevented by the reinforcement member 50.

Consequently, the strength (rigidity) of the elastic deformation region of the front side bent portion 22 as well as the strength (rigidity) of the plastic deformation region can be improved, and elastic deformation where the front side bent portion 22 bends can be controlled. Thus, when the vehicle 12 travels, vibration and noise produced in the vehicle 12 and a drop in the maneuvering stability of the vehicle 12 can be controlled or prevented.

Furthermore, in a case where the vehicle 12 frontally crashes (a full overlap crash or an offset crash) into a non-illustrated barrier, the load resulting from the impact is input to the front end portion of the front side member 14 via a non-illustrated front bumper reinforcement and crash box, and the front side bent portion 22 tends to undergo bending deformation.

Here, the reinforcement member 50 is disposed in the front side bent portion 22 of the front side member 14 as described above, and the strength (rigidity) of the plastic deformation region is improved. That is, the engagement rib 54 of the first reinforcement member 52 and the engaging ribs 58 of the second reinforcement member 56 extend in the longitudinal direction along the input direction of the load, and the orientation direction of the fibers of the upper wall 56A and the engaging ribs 58 of the second reinforcement member 56 is along the input direction of the load (the longitudinal direction).

Consequently, a strong reaction force (resistive force) with respect to the tensile force along the orientation direction of the fibers (the longitudinal direction) can be produced in the upper wall 56A and the engaging ribs 58 of the second reinforcement member 56. Additionally, cross-sectional deformation of the second reinforcement member 56 is controlled or prevented by the reinforcement ribs 64, and cross-sectional deformation of the first reinforcement member 52 is controlled or prevented by the reinforcement ribs 62.

Thus, even if a crash load is input to the front end portion of the front side member 14 and the front side bent portion 22 tends to undergo bending deformation (and particularly the lower wall 34 and the ridgeline portions 34A that are the vehicle width direction end portions of the lower wall 34 tend to undergo buckling deformation toward the vehicle body upper side), the bending deformation (buckling deformation) is effectively controlled.

Furthermore, when the front side bent portion 22 tends to undergo bending deformation, the lower member 30 undergoes compressive deformation and the first reinforcement member 52 becomes deformed in such a way that it moves toward the second reinforcement member 56 side. Because of this, the bulging portion 54B of the engagement rib 54 is pressed into contact with (bottoms out against) the partition wall ribs 66, and the upper end portions of the inner wall 52B and the outer wall 52C are pressed into contact with (bottom out against) the reinforcement ribs 64, so the load is efficiently transmitted from the first reinforcement member 52 (the lower member 30) to the second reinforcement member 56 (the upper member 40).

Consequently, during a frontal crash of the vehicle 12, the compressive force applied to the maximum bent portion P on the compressive deformation side of the front side bent portion 22 (the lower wall 34) is reduced as a result of the engagement rib 54 (the bulging portion 54B) being pressed into contact with (bottoming out against) the partition wall ribs 66, and compressive deformation (bending deformation) at the maximum bent portion P is alleviated. In other words, bearing force with respect to the bending deformation of the front side bent portion 22 is significantly improved.

Thus, during a frontal crash of the vehicle 12, the straight section of the front side member 14 on the vehicle body front side of the front side bent portion 22 can be efficiently caused to undergo compressive deformation (be crushed) in its axial direction (the vehicle body front and rear direction), and the input crash load can be efficiently absorbed by the straight section of the front side member 14.

In this way, according to the reinforcement member 50 pertaining to the first embodiment, the front side bent portion 22 (the site predicted to undergo bending deformation) that tends to undergo bending deformation due to a load input to the front side member 14 can be locally and efficiently reinforced, so a drop in crash safety performance attending poor axial direction compressive deformation of the front side member 14 and an increase in the amount of bending deformation of the front side bent portion 22 can be controlled or prevented.

In other words, during a frontal crash of the vehicle 12, deformation of the cabin 20 can be controlled or prevented, and a wide space in the front and rear direction of the cabin 20 can be ensured. Moreover, the reinforcement member 50 is made of fiber-reinforced resin and is made lightweight, so fuel economy can be improved and exhaust gas can be reduced compared to a structure reinforced by plate metal or the like.

Furthermore, the first reinforcement member 52 and the second reinforcement member 56 are mated with one another as the lower member 30 and the upper member 40 are joined to one another, so the reinforcement member 50 has a closed cross-sectional structure and is disposed in the closed cross-sectional structure of the front side member 14. Consequently, the reinforcement member 50 can be easily disposed (a double closed cross-sectional structure can be easily configured) and the productivity of the reinforcement member 50 can be improved compared to a configuration where the reinforcement member 50 has a closed cross-sectional structure beforehand and is disposed in the closed cross-sectional structure of the front side member 14.

Furthermore, the reinforcement member 50 having the closed cross-sectional structure is formed as a result of the second reinforcement member 56 sandwiching, holding, and mating with the first reinforcement member 52, so the mating (joint) strength of both can be improved. Additionally, particularly the position at which the claw portions 58A sandwich, hold, and mate with the recessed groove portions 54A is on the lower member 30 side of the flange portions 32 and 42, so a drop in the strength (rigidity) of the mated rib 54 can be controlled. It should be noted that the same is also true of cases where the reinforcement member 50 is disposed in the rear side bent portion 24 and/or the front side bent portion and the rear side bent portion of the rear floor side member 16.

Furthermore, the reinforcement member 50 is made of fiber-reinforced resin and is made lightweight, so among frame members having closed cross-sectional structures configuring the framework of the vehicle 12, the reinforcement member 50 can be disposed not just in sites bent and molded beforehand but in all sites predicted to undergo bending deformation during a crash of the vehicle 12. For example, as shown in FIG. 1, the reinforcement member 50 can be disposed in the closed cross-sectional structure of a center pillar 26 that extends substantially straightly in the vehicle body up and down direction.

In a case where the reinforcement member 50 is disposed in the closed cross-sectional structure of the center pillar 26, which is an example of a site that is not bent and molded beforehand, as shown in FIG. 4, it suffices for the reinforcement member 50 to be formed substantially straightly in such a way that its longitudinal direction is along the longitudinal direction of the center pillar 26 (the vehicle body up and down direction). Additionally, it suffices for the first reinforcement member 52 to be joined to the inner surface of an outer panel (not shown in the drawings) at a predetermined site of the center pillar 26 predicted to undergo bending deformation during a side crash of the vehicle 12 and for the second reinforcement member 56 to be joined to the inner surface of an inner panel (not shown in the drawings).

According to this configuration, the recessed portions 53 and the recessed groove portions 54A of the first reinforcement member 52 and the raised portions 57 and the claw portions 58A of the second reinforcement member 56 mate with one another as the inner panel and the outer panel are joined to one another, so the reinforcement member 50 having a closed cross-sectional structure is easily disposed in the center pillar 26 having a closed cross-sectional structure (a double closed cross-sectional structure is easily configured).

Additionally, when the vehicle 12 is involved in a side crash and the predetermined site of the center pillar 26 undergoes bending deformation (buckling deformation) inward in the vehicle width direction, the outer panel side becomes the compressive deformation side and the inner panel side becomes the tensile deformation side, so the second reinforcement member 56 is pulled along its longitudinal direction—i.e., the orientation direction of the fibers. Because of this, a strong reaction force (resistive force) with respect to the tensile force is produced in the second reinforcement member 56, so bending deformation of the center pillar 26 inward in the vehicle width direction is controlled.

Moreover, cross-sectional deformation of the reinforcement member 50 in the vehicle body front and rear direction is controlled or prevented by the reinforcement ribs 62 and 64, so cross-sectional deformation of the center pillar 26 in the vehicle body front and rear direction is controlled or prevented. In other words, bending deformation of the center pillar 26 inward in the vehicle width direction is more effectively controlled by the reinforcement member 50 equipped with the reinforcement ribs 62 and 64. Consequently, deformation of the cabin 20 during a side crash of the vehicle 12 can be more effectively controlled.

Second Embodiment

Next, a second embodiment will be described. In the second embodiment, the shape of the reinforcement member 50 differs from that of the reinforcement member 50 of the first embodiment. It should be noted that, in the second embodiment, the same reference signs are assigned to sites that are the same as those in the first embodiment and detailed description (also including action shared in common) will be appropriately omitted. Furthermore, in the second embodiment, the reinforcement member 50 disposed in the front side bent portion 22 of the front side member 14 will be taken as an example and described.

As shown in FIG. 5 and FIG. 6, in the reinforcement member 50 pertaining to the second embodiment, recessed groove portions 60 having a predetermined depth are formed along the longitudinal direction in the center portions of the upper end surfaces of the inner wall 52B and the outer wall 52C of the first reinforcement member 52. Additionally, projecting portions 70 that are inserted into (mated with) the recessed groove portions 60 are formed along the longitudinal direction in the center portions of the lower end surfaces of the inner wall 56B and the outer wall 56C of the second reinforcement member 56.

Furthermore, an adhesive J is applied to the inner surfaces of the recessed groove portions 60, and the outer surfaces of the projecting portions 70 are joined by the adhesive J to the inner surfaces of the recessed groove portions 60, so that the lower end portions of the inner wall 56B and the outer wall 56C of the second reinforcement member 56 are strongly joined to the upper end portions of the inner wall 52B and the outer wall 52C of the first reinforcement member 52.

In other words, the joint strength between the lower end portions of the inner wall 56B and the outer wall 56C of the second reinforcement member 56 and the upper end portions of the inner wall 52B and the outer wall 52C of the first reinforcement member 52 is improved by the adhesive J, so that the framework reinforcement effect resulting from the reinforcement member 50 is enhanced.

It should be noted that the reinforcement member 50 may be configured in such a way that gaps are formed between the inner surfaces of the recessed groove portions 60 and the outer surfaces of the projecting portions 70 to thereby absorb variations when attaching the projecting portions 70 to the recessed groove portions 60. Moreover, the gaps may act as retention portions for the adhesive J to thereby stabilize and increase the joint strength with the adhesive J.

Furthermore, the mated rib 54, which does not have the recessed groove portions 54A or the bulging portion 54B formed in its upper end, is integrally and projectingly disposed on the transverse direction center portion of the lower wall 52A of the first reinforcement member 52. Specifically, the mated rib 54 is formed in a tapered shape heading toward its upper end portion as seen in the cross-sectional view shown in FIG. 5.

Furthermore, just one mating rib 68 thicker in plate thickness than the mating ribs 58 in the first embodiment is integrally and projectingly disposed on the transverse direction center portion of the upper wall 56A of the second reinforcement member 56. Additionally, a recessed groove portion 68A is formed along the longitudinal direction in the center portion of the lower end surface of the mating rib 68, and the upper end portion of the mated rib 54 formed in a tapered shape can be inserted into (mated with) the recessed groove portion 68A.

It should be noted that an adhesive J is also applied to the inner surface of the recessed groove portion 68A, and the outer surface of the upper end portion of the mated rib 54 is joined by the adhesive J to the inner surface of the recessed groove portion 68A, so that the mated rib 54 and the mating rib 68 are strongly joined to one another. In other words, the joint strength between the mated rib 54 and the mating rib 68 is improved.

Also with the reinforcement member 50 pertaining to the second embodiment having the above configuration, the same action and effects as those of the first embodiment are obtained. In particular, when a crash load is input to the front end portion of the front side member 14 and the front side bent portion 22 tends to undergo bending deformation, the mated rib 54 is pressed into contact with (bottoms out against) the mating rib 68, so the load is efficiently transmitted from the first reinforcement member 52 (the lower member 30) to the second reinforcement member 56 (the upper member 40). Furthermore, the reinforcement member 50 pertaining to the second embodiment may also be disposed in the closed cross-sectional structure of the center pillar 26.

The framework structure 10 for the vehicle 12 pertaining to the embodiments has been described above on the basis of the drawings, but the framework structure 10 for the vehicle 12 pertaining to the embodiments is not limited to what is shown in the drawings and can appropriately undergo design changes without departing from the spirit of the present invention. For example, the framework structure 10 may also have a configuration where the pair of mating ribs 58 are disposed on the first reinforcement member 52 side and the mated rib 54 is disposed on the second reinforcement member 56 side.

However, in terms of the manufacturing yield of the reinforcement member 50, it is more advantageous to dispose the pair of mating ribs 48 on the second reinforcement member 56 side whose depth is shallow (whose height is low). That is, it is more cost advantageous to dispose the pair of mating ribs 58 on the second reinforcement member 56 side because less fiber-reinforced resin material is needed to mold the first reinforcement member 52 and the second reinforcement member 56.

Furthermore, the first reinforcement member 52 and the second reinforcement member 56 are not limited to a configuration where they are joined by the adhesive J to frame members such as the front side member 14 and the center pillar 26 and may also have a configuration where they are joined by non-illustrated joining hardware such as nuts and bolts and/or rivets, for example.

Moreover, the first reinforcement member 52 and the second reinforcement member 56 may also be disposed in the inner panel and the outer panel of a front pillar 28 (see FIG. 1) and may also have a configuration where they are disposed by insert molding or prepreg molding in frame members such as the front side member 14, the center pillar 26, and/or the front pillar 28.

Furthermore, the disclosure of Japanese Patent Application No. 2013-175901 is incorporated in its entirety herein by reference. All documents, patent applications, and technical standards mentioned in this specification are incorporated herein by reference to the same extent as if each individual document, patent application, and technical standard were specifically and individually indicated to be incorporated by reference.

The invention claimed is:

1. A framework structure for a vehicle, comprising:
   a first frame member that configures a part of a framework of the vehicle;
   a second frame member that is joined to the first frame member to thereby configure the framework, the framework having a closed cross-sectional structure;
   a first reinforcement member that is made of fiber-reinforced resin, the first reinforcement member having an engagement portion and being joined to an inner side of the first frame member; and
   a second reinforcement member that is made of fiber-reinforced resin, the second reinforcement member having an engaging portion and being joined to an inner side of the second frame member, wherein the engaging portion is engaged with the engagement portion, whereby the second reinforcement member configures, with the first reinforcement member, a reinforcement member having a closed cross-sectional structure.

2. The framework structure for a vehicle according to claim 1, wherein:
   the engagement portion of the first reinforcement member includes an engagement rib; and
   the engaging portion of the second reinforcement member includes a pair of engaging ribs that sandwich, hold, and engage with the engagement rib.

3. The framework structure for a vehicle according to claim 2, wherein the second reinforcement member has a partition wall portion between the pair of engaging ribs.

4. The framework structure for a vehicle according to claim 2, wherein a position at which the pair of engaging ribs sandwich, hold, and engage with the engagement rib is located at a first frame member side of a position at which the second frame member is joined to the first frame member.

5. The framework structure for a vehicle according to claim 1, wherein the engaging portion is joined by an adhesive to the engagement portion.

6. The framework structure for a vehicle according to claim 1, wherein the first reinforcement member and the second reinforcement member each have a plurality of reinforcement ribs aligned with an interval therebetween in a longitudinal direction.

7. The framework structure for a vehicle according to claim 1, wherein fibers in the first reinforcement member and the second reinforcement member are oriented along a longitudinal direction.

8. The framework structure for a vehicle according to claim 6, wherein:
   the framework has a bent portion; and
   the reinforcement ribs are formed at sites of the first reinforcement member and the second reinforcement member corresponding to the bent portion.

* * * * *